United States Patent [19]

Trema

[11] Patent Number: 5,007,497
[45] Date of Patent: Apr. 16, 1991

[54] ARM SUPPORT DEVICE FOR A ROTATING ELEMENT

[75] Inventor: Daniel Trema, Bezons, France

[73] Assignee: Elf France, Courbevoie, France

[21] Appl. No.: 317,921

[22] Filed: Mar. 2, 1989

[30] Foreign Application Priority Data

Mar. 14, 1988 [FR] France ................................. 88 03280

[51] Int. Cl.$^5$ .......................... B62K 25/20; B62M 9/16
[52] U.S. Cl. ..................................... 180/219; 180/226;
180/227; 280/284; 280/285; 280/286; 280/288;
474/116
[58] Field of Search ....................... 180/219, 226, 227;
280/284, 285, 286, 288; 474/116

[56] References Cited

U.S. PATENT DOCUMENTS

| | | | |
|---|---|---|---|
| 601,346 | 3/1898 | Leaycraft ............................. | 474/116 |
| 2,099,817 | 11/1937 | Mahana ........................... | 474/116 X |
| 4,541,502 | 9/1985 | Iwai et al. ........................ | 474/116 X |

FOREIGN PATENT DOCUMENTS

| | | | |
|---|---|---|---|
| 291369 | 11/1988 | European Pat. Off. ............ | 180/219 |
| 2529160 | 12/1983 | France ................................ | 180/227 |
| 1276557 | 12/1986 | U.S.S.R. .............................. | 474/116 |
| 8092 | of 1893 | United Kingdom ................ | 474/116 |

Primary Examiner—Mitchell J. Hill
Attorney, Agent, or Firm—Burgess, Ryan & Wayne

[57] ABSTRACT

The rotary axle of the support arm device is adapted to be maintained in position rigidly and in adjustable manner at the free end of the arm and the free end of the arm comprise plane and generally axial bearing surfaces adapted to contact corresponding bearing surfaces directed generally transversally and provided on two rings of a removable bracket piece in order to allow a rigid blocking of this bracket piece on the free end of the arm after adjusting the position and the device is applied when an easy adjusting of the chain tension is required, especially for a rear wheel of a motorcycle.

8 Claims, 1 Drawing Sheet

ARM SUPPORT DEVICE FOR A ROTATING ELEMENT

BACKGROUND OF THE INVENTION

1. Field of the Invention

The present invention concerns an arm device for supporting a rotating element, the end of which is subject to great forces, such as, for example the single support and suspension rear arm of a driving wheel of a motorcycle, in which the rotary support axle of the rotating member is adapted to be maintained rigidly in position in an adjustable manner at the free end of the arm. It also concerns the support arm per se ready to receive the removable bracket piece of the rotary axle as well as the bracket piece of the rotary axle with means that allow it to be rigidly connected, but nevertheless in an adjustable manner, with the support arm.

2. Summary of the Prior Art

Such support arms which constitute first a development of current automobile manufacture, are used on motorcycles in order to support the rear driving wheel of these vehicles. An advantageous adaptation to the motorcycle consists in mounting the rear wheel and the brake disk on the rotary axle on one side of the arm while the sprocket or chain pinion is mounted on the axle on the other side of the arm, thereby allowing rapid wheel change and, where necessary, removal of the brake disk without having to modify the adjustment of the chain. In these wheel mountings on a single arm, the chain tension adjustment is generally performed by means of an eccentric system that carries the high rigidity bearings of the rotary axle. The eccentric system is thus constituted by an accentric bearing support that is caused to rotate there about in a receiving bore in order to adjust the chain tension and which, after adjustment, is blocked by pressing together, i.e. by moving together the lips of a slot opening upon the receiving bore.

These means for adjusting the chain tension have been tested in competition and the maintaining in position of the accentric bearing support by pressing has proved to be reliable and fairly easy to operate. However, these chain tension adjusting means present various drawbacks revealed during use, namely:

precise adjustment of the chain tension has proved to be very difficult to perform in the end stroke zones of the eccentric system., due to the absence of screw positioning means;

adjustment of the chain tension only provides, within admissible limits of required space, a restricted adjustings stroke of about one chain link at the maximum, whereas it would be necessary to dispose of a adjusting stroke exceeding two links;

during the adjustment by rotation of the eccentric bearing support, a variation of the direction of the chain occurs with respect to the support arm which carries the friction chain guides and, sometimes even, has a chain channel passing through it in its zone subjected to the maximal stresses. Such a variation in direction has proved to be prejudicial for the correct guiding of the chain when the chain is at a distance from the central adjusting zone and the need was expressed to return to an adjustment of the chain tension by axial traction;

means for adjusting the chain tension must currently resist chain traction forces that exceed 2000 daN for the small diameter rear wheel chain sprockets, which are necessary in order to limit the chain speeds of high speed motorcycles.

The aim of the present invention is to overcome the defects and drawbacks described herein-above while preserving a chain adjustment that is easy to perform, reliable and simple to manufacture.

With this aim, according to the invention, the free end of the arm comprises plane and generally axial bearing surfaces, adapted to enter into contact with corresponding and generally transversally directed bearing surfaces, provided on a removable bracket piece of the rotary axle, so as to axially guide this bracket piece in order to ensure adjustment of the axial position of the bracket piece and to allow the rigid blocking of this bracket piece on the bearing surfaces of the free end of the arm by a radial pressing wedging upon contact between the said corresponding bearing surfaces which are generally and respectively directed axially and transversally.

According to another embodiment, the axial bearing surfaces provided at the end of the arm are foreseen on the faces of the free end of the arm which are disposed in a polygonal manner, for example square or rectangular, about the median mean line of the arm, whereby the rotation of the bracket piece about this mean median line during the adjustment displacements of the said bracket piece is prevented.

The support arm can comprise, on each face, disposed polygonally and on the side opposite the bearing surfaces, at least one rib destined to ensure the strengthening and the stiffness of the said face. The support arm can also comprise abutment means, adjustable where necessary, adapted to cooperate with corresponding abutment means provided on the bracket piece, in such a manner as to allow the exact adjustment of the axial position of this bracket piece prior to its rigid blocking on the free end of the arm.

According to another embodiment, the bearing surfaces on the free end of the arm are provided on the inner wall of the end of the arm in order to cooperate with corresponding bearing surfaces provided on the external surface of the bracket piece and means for pressing and wedging are provided on the external surface of the end of the arm.

According to another particularly advantageous embodiment of the invention, the bearing surfaces on the free end of the arm are provided on the external faces at the end of the arm in order to cooperate with corresponding bearing surfaces provided on the inner wall of a generally tubular portion of the bracket piece. The other portion of the bracket piece comprises at least one bearing shell in which is provided a bearing bore intended to receive and support the rotary shaft and the tubular portion comprises at least one pressing and wedging means. The corresponding bearing surfaces provided on the inner wall are placed, preferably, along at least two transversel rings, generally annular and protruding from the inside of the said inner wall. Pressing and wedging means are provided opposite each bearing surface ring and is constituted by at least one axial slot provided opposite the transversel ring protruding from the width of this ring, each of the lips of the slot being extended towards the outside by a pressing lug adapted to be crossed through at least partially by a pressing screw. The free end of support arm comprises at least one notch having a generally rounded shape and adapted to receive at least one part of the bearing shell of the bracket piece.

According to another embodiment facilitating the exact adjustment of the position of the bracket piece, at least one axial groove opened towards the outside but closed at the end is provided on at least two substantially diametrically opposed bearing surfaces and is adapted to receive bearing members, for example a spindle or roller plate, interposed between the internal bearing surfaces of the bracket piece and the bottom of the said groove in order to facilitate the axial adjustment movement of the bracket piece with respect to the support arm.

The bracket piece of a rotary axle according to the invention, for example of the axle of a motorcycle rear wheel, intended to be fitted onto or within the free end of a support arm to constitute a previously described support arm device, has a generally tubular form open at one end with bearing surfaces provided on its inner wall, while its other end is closed by a bearing shell intended to receive the rotary axle and its bearing members. The bearing surfaces provided on the bracket piece are disposed according to at least one transversel piece having a generally annular shape and protruding inwardly from the inner wall.

The bracket piece advantageously comprises opposite each bearing surface ring at least one pressing mean constituted by an axial slot each lip of which is extended outwardly by a pressing lug adapted to be crossed through at least partially by a pressing screw. The bracket piece has the general form of a tube with internal or external square or rectangular cross-sections, open at one end and closed at the other by a bearing shell having the general shape of a revolution body, extended outwardly by at least one pivoting bracket lug of a wheel braking member.

BRIEF DESCRIPTION OF THE DRAWINGS

Other aims, advantages and features will become apparent from the following description of an embodiment of the invention, given by way of non-limitative illustration with respect to the appended drawings in which:

FIG. 1 shows the single support arm of a rear motorcycle wheel constituted by a single cast piece 1, (in aluminum or magnesium alloy, for example) and which is provided with a front fork having two arms 2 and 3, connected together by a stay or cross-piece 4 and pivotally connected to a motorcycle rear chassis (not represented) in order to rotate about an axis of rotation 5, in relation with a spring and shock absorber suspension assembly (not represented). The arm 1 has a central section 6 of relatively great height (cf. cross-section on FIG. 2) to resist the flexion and torsion stresses that are developed therein combined to those generated by the pivoting connections 7 of the suspension members. The section 6 is crossed through by a chain channel 8 and is extended rearwards by a generally U-shaped portion 9a, with a rectangular cross-section, in order to surround in 9 the passage of the rear wheel (not represented).

Figure 3:
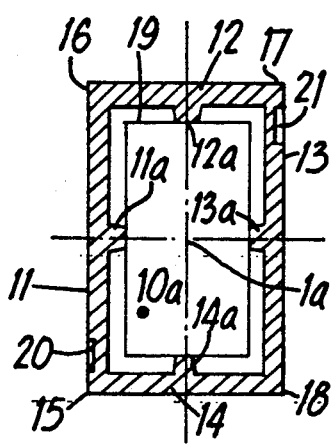
FIG. 3 represents, on a larger scale than on FIG. 1, the cross-section according to plane III—III of FIG. 1 of the end of the arm onto which is forcibly fitted the bracket piece of the rotary axle.

The U-shaped portion 9 is intended to surround the section of the wheel hub and tire of the wheel is extended outwardly by an end part 10 substantially straight and directed in the median plane of the motorcycle. This portion 10 has a tubular rectangular section represented in cross-section on FIG. 3. It will be noted on this cross-section view that the four outer faces of the rectangular section constitute generally axially directed plane bearing surfaces 11, 12, 13, 14, machined with chamfers 15, 16, 17, 18 in order to break the ridges formed between too adjacent faces. The rectangular section that could be replaced by another polygonal square or hexagonal form, for example, suppresses any risk of rotation during axial adjustment displacements of the wheel bracket piece mounted on this free end 10 of the arm 1. For each face of the end part 10 is provided, on the side opposite the corresponding face 11, 12, 13, 14 a rib 11a, 12a, 13a, 14a intended for improved resistance to the stresses and forces applied on the face and to increase the stiffness of this face which must retain as much as possible its plane shape, after tooling, despite the various pressing forces to which is subject the end part 10. The ribs 11a, 12a, 13a, 14a which could, in an alternative, cross through the entire section of the end piece 10, join at the bottom of the internal space 10a of the tubular end part 10 in order to form an annular inner flange 19 connecting with the front part of the support arm 1. The mean median line of the arm 1 which was straight in the end part 10 up to the flange 19 is thus directed in a curve in order to form a kind of large C or U-shape surrounding the section of the motorcycle wheel.

Axial grooves open towards the outside but closed at ends 20, 21, 22, 23 are provided in opposing faces 11, 13 for example by milling with a vertical milling cutter. These grooves are intended to receive rolling members (not represented) such as needles or roller plates, that are interposed between the bearing surfaces of the bracket piece and the bottom, preferably flat, of the groove in order to ease the sliding of the shell of the bracket piece around the adjusting faces.

Figure 1:
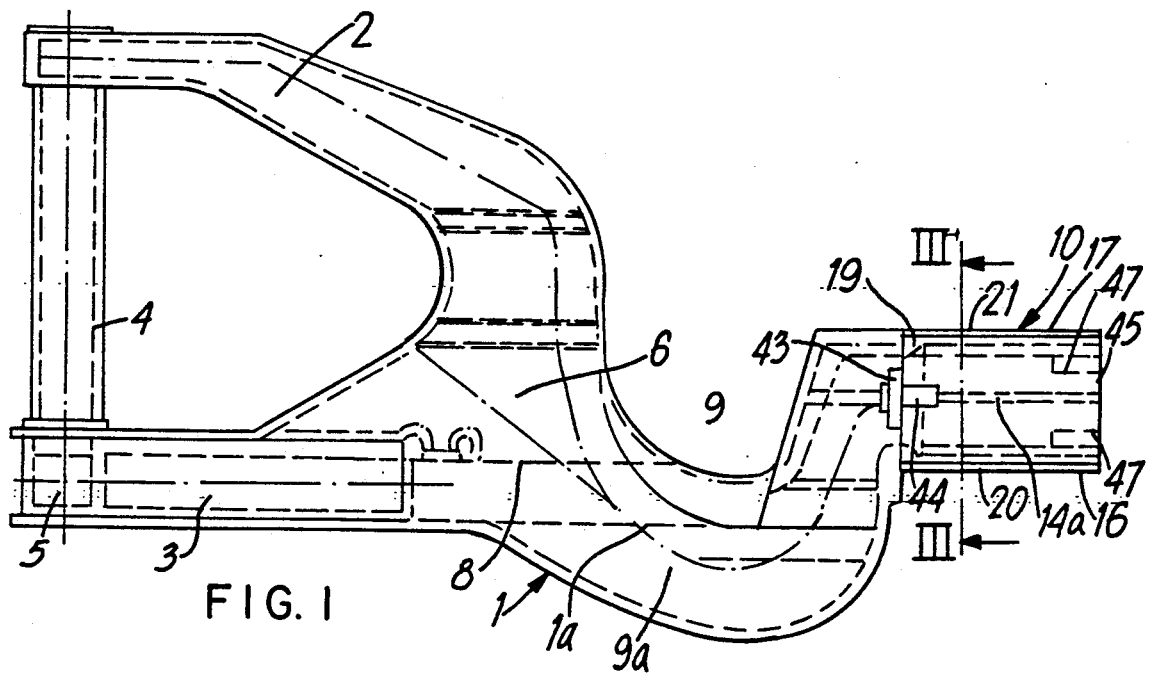
FIG. 1 is a plane view of a wheel support arm according to the invention, prior to mounting the bracket piece of the rotary axle on which is mounted the rear wheel of a motorcycle.
Figure 2:
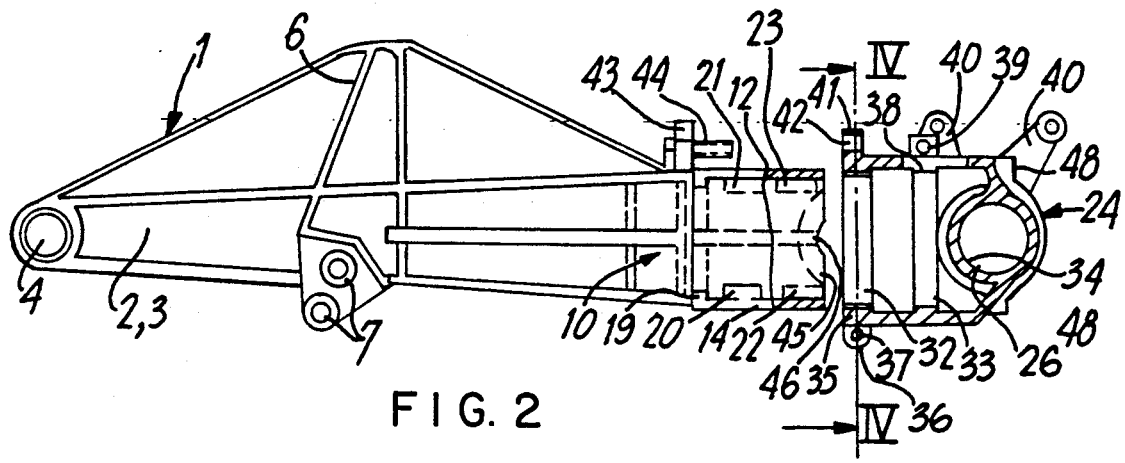
FIG. 2 represents respectively, in lateral elevation and on a smaller scale, the support arm of FIG. 1 and, in longitudinal cross-section according to plan IIA—IIA of FIG. 4, the removable bracket piece of the rotary axle, immediately prior to fitting said bracket piece on the free end of the arm. The cross-section of the support arm according to plane I—I of the FIG. 1 is represented in an exploded view on this elevation view and the free end of the arm is in partial cross-section according to plane II—II of FIG. 1.
Figure 4:
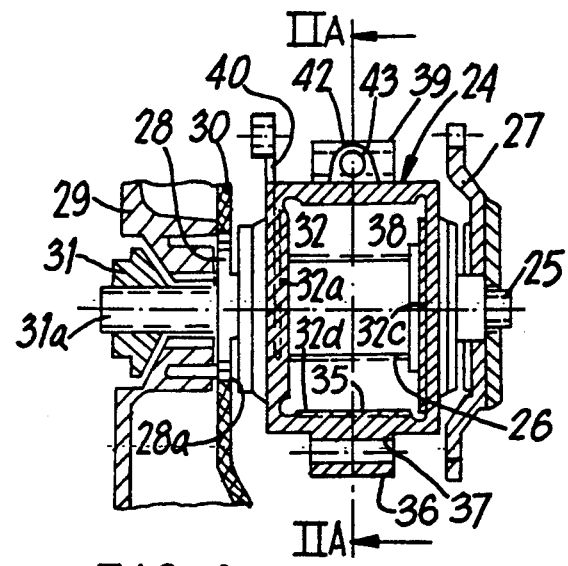
FIG. 4 represents, substantially on the same scale as in FIG. 3, the cross-section according to plan IV—IV on FIG. 2 of the bearing support piece equipped with a chain driving sprocket or ring and with a wheel and a brake disk partially represented in fragmentary view and in cross-section.

FIG. 2 shows the removable bracket piece 24 of the rotary axle 25 which is represented on FIG. 4. The rotary axle 25 is mounted on solid bearings, for example with conical rollers (not represented) and housed in a bearing shell 26. The rotary axle 25 carries, on one side of the bracket piece a toothed chain sprocket 27 and, on the other side, by means of a flange 28 and intercalating screws 28a, a wheel hub 29 coupled to a brake disk 30 and pressed onto the flange 29 by means of a nut 31 screwed onto a threaded end-piece 31a of the axle 25a.

The bracket piece 24 is provided, on the side of the end portion 10, with a tubular part on the inner wall of which are provided two transversel rings 32 and 33 of bearing surfaces 32a, 32b, 32c 32d, (cf. FIG. 4) protruding inwardly. On the side opposite the end portion 10 of the arm 1, the bracket piece 24 is closed by the bearing shell 26 which is provided with a bore 34 for receiving the bearings of the rotary axle 25. At the lower part (according to FIG. 2) of the ring 32 is provided a longitudinal slot 35 the lips of which are each extended by a pressing lug 36 provided with a bore 37 allowing the positioning of a pressing screw or nut. Moreover, the top part of the bearing ring 33 is provided with a pressing slot 38 protruding the width of the ring 33 and each lip of which is extended by a pressing clip 39 having the same function as lug 37. At the top part of the bracket piece and adjacent to the hearing shell 26, issue the supports 40 of a wheel braking member (not represented).

At the upper part of the bracket piece 24 is foreseen, protruding, an axial adjustment lug 41 provided with a threaded bore 42. At the level of the internal strengthening ring 43 the single arm 1 carries an abutment plate 43 in which is screwed an abutment positioning screw 44 which can be screwed into the threaded bore 42. It will also be noted that the end 45 of the support arm 1 and thus of the end portion 10 is provided with a notch 46 having a rounded form and adapted to receive part of the bearing shell 26. The opening angles of the free end 45 comprise short length bosses 47 in which is provided a threaded bore (not represented). The screw (not represented) crossing through the corresponding bosses 48 provided on the bracket piece 24 adjacent to the bearing shell 26, can be screwed into the threaded bores of the bosses 47 in order to facilitate the axial adjusting displacement of the bracket piece 24 and, where necessary, strengthen the friction relation between this bracket piece and the end portion 10 of the arm 1.

FIG. 2 illustrates the operating of the complete support arm device according to the invention. The bracket piece 24 is introduced, preferably equipped with the rotary axle 25 and its equipment (complete wheel, brake disk 30, pinion sprocket 27) on the end portion 10 by axial sliding according to the arrow F and is applied, through its inner faces 32a, 32b, 32c, 32d, of the rings 32 and 33 onto the corresponding faces 11, 12, 13, 14 of the end portion 10.

After the placing in position of the chain (not represented) on the chain sprocket 27, it is possible to adjust the chain tension by engaging the screw 44 in the threaded bore 42. When the chain tension has been adjusted, the bracket piece 24 is rigidly secured on the end piece 10 by pressing the lugs 36 and 39 of the slots 35 and 38. The most violent efforts and stresses exerted on the rotary axle 25 therefore could not produce shifting or sliding of the bracket piece 24 with respect to the support arm 1 since the pressing by wedging, combined with the surfaces adjustment, produces a very strong blocking of the corresponding surfaces which is able to withstand the worst possible vibration fields effects.

Numerous embodiment variants and applications of the invention are possible. Therefore, it is possible to foresee transversel blocking screws crossing through the annular wall of the bracket piece 24 and resting upon a hollow rest surface provided on the rest surfaces 11, 12, 13, 14, in the same manner as grooves 20, 21, 22, 23. The pressing of the bracket piece on the end portion 10 can be achieved by means of a cam or eccentric system, with rapid action, allowing the quasi instantaneous adjustment of the chain tension. The section of the external or internal bearing faces on the end portion 10 need no longer be polygonal but can be circular, which facilitates machining, with one or several axial guiding grooves or channels.

It is well understood that the present invention is in no way limited to the embodiments described and represented herein-above, but can be adapted to numerous variants available to those skilled in the art without departing from the scope and spirit of the invention.

I claim:

1. A single swinging suspension rear arm for the driving wheel of a motorcycle comprising:
    a free end portion adapted to have a rotary axle maintained thereon in a rigid and adjustable manner, and comprising axial outside polygonally disposed bearing surfaces;
    a bracket piece removably and adjustably mounted on the free end portion of the arm and adapted to receive the rotary axle, said bracket piece comprising an inner wall having transversely positioned bearing faces adapted to contact the corresponding axial outside bearing faces of the free end portion of the arm when the bracket piece is mounted thereon, and at least one slot axially disposed in said inner wall at a position opposed to one of said inner wall bearing faces, said bracket piece adapted to move axially along the arm; and
    screw means adapted to radially close the slot thereby preventing further movement of the bracket piece along said arm.

2. An arm according to claim 1, wherein the free end of the swinging arm further comprises, at least one internal rib on a side opposite each of the outside bearing surfaces of the arm for improving the resistance to stresses and the stiffness of said surfaces.

3. An arm according to claim 1 wherein the corresponding bearing surfaces on the inner wall of the bracket piece to form at least two transverse rings having a generally annular shape and protrude inwardly from said inner wall.

4. An arm according to claim 3, wherein the bracket piece further comprises a separate and axially disposed slot opposite each transverse ring of the corresponding bearing surfaces of the bracket piece.

5. An arm according to claim 3 wherein each axially disposed slot is wider than the corresponding transverse ring of the bearing surfaces of the bracket piece, said slots having an outwardly extending lip and a screw means adapted to pass through said lip.

6. An arm according to claim 1 wherein the bracket piece comprises a free end portion and an open portion surrounding the free end portion, said free end portion having at least one bearing shell including a bearing bore for receiving and supporting the rotary axle, said open portion having a tubular shaped wall having therein at least one axial slot.

7. An arm according to claim 6, wherein the free end portion of the single arm further comprises at least one generally circular notch adapted to receive at least a portion of the bearing shell of the bracket piece.

8. An arm according to claim 1, wherein at least two opposed axial bearing surfaces of the free end portion of the single arm comprise at least one axial groove opened towards the outside but closed at the end thereof.

* * * * *